Sept. 7, 1954     F. GIESBRECHT     2,688,221
VINE CUTTER
Filed Sept. 17, 1951     2 Sheets-Sheet 1
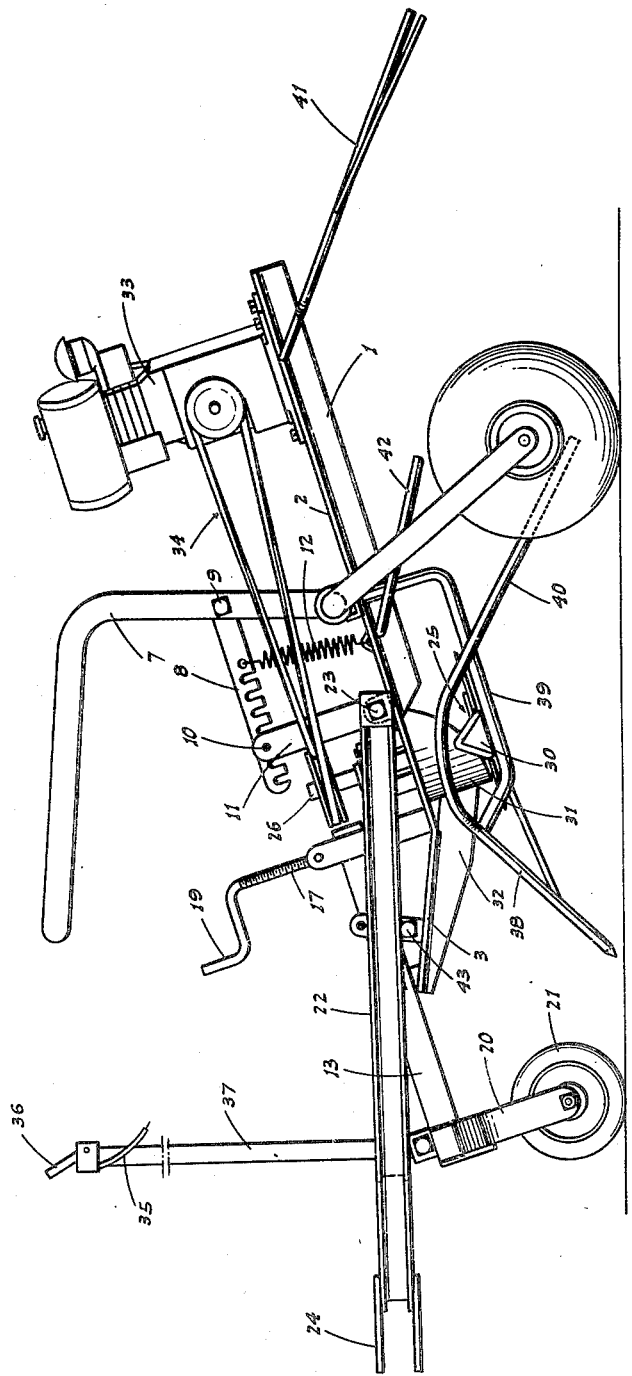
INVENTOR
Frank Giesbrecht
BY Webster & Webster
ATTORNEYS

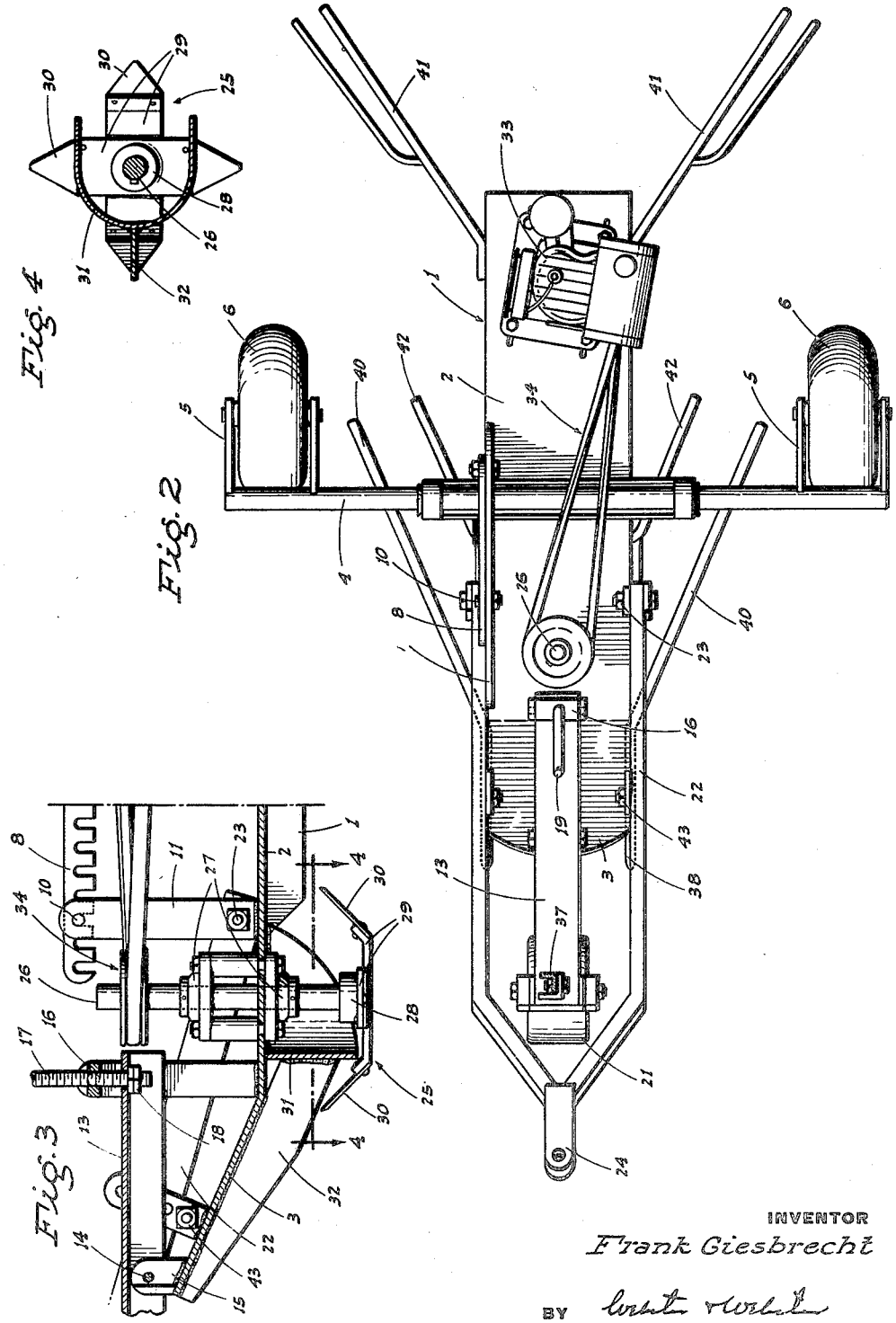

Patented Sept. 7, 1954

2,688,221

UNITED STATES PATENT OFFICE 2,688,221

VINE CUTTER

Frank Giesbrecht, Winton, Calif., assignor to
G. and M. Equipment Company, Winton, Calif.,
a partnership Application September 17, 1951, Serial No. 247,003

3 Claims. (Cl. 55—64)

This invention is directed to, and it is an object to provide, a novel tractor drawn, power actuated vine cutter; the implement being operative to effectively cut the vines along the top of a crop row or ridge and to deposit the cut vines in the furrows along the sides of the ridge whereby the latter is thereafter unobstructed on top for the purpose of digging the crop, such as sweet potatoes or the like.

Another object of the invention is to provide a vine cutter which embodies a novel power driven rotary cutter and vine deflector assembly.

A further object of the invention is to provide the implement with a novel adjustable frame structure which permits the rotary cutter to be set to work in the proper horizontal plane as the implement advances in straddling relation along a crop row; the frame structure being supported by a tricycle wheel arrangement.

An additional object of the invention is to provide a vine cutter which is fast and clean cutting in operation with a minimum of entanglement of vines with the implement when it is in motion; the cut vines being deflected to opposite sides of the row.

A still further object of the invention is to provide a vine cutter which is constructed for long service with little servicing or repair being required; the structure of the implement being strong and rugged.

It is also an object of the invention to provide a vine cutter which is designed for ease and economy of manufacture.

Still another object of the invention is to provide a practical and reliable vine cutter, and one which will be exceedingly effective for the purpose for which it is designed.

Fig. 1 is a side elevation of the implement.

Fig. 2 is a top plan view of the same.

Fig. 3 is an enlarged fragmentary sectional elevation of the frame structure showing the journal for the rotary cutter, and the adjusting means for the longitudinal supporting beam.

Fig. 4 is a fragmentary plan view on line 4—4 showing the rotary cutter and the shield for the spindle.

Referring now more particularly to the characters of reference on the drawings, the implement comprises a longitudinally extending main frame 1 fitted on top with a deck 2, such main frame being disposed at a slight forward and downward incline, with the forward portion of such frame up-bent slightly, as at 3.

The main frame 1 is supported above ground, and for travel along a crop row above the same, by means of a cross shaft 4 journaled on said main frame 1 and being fitted at opposite ends with downwardly and rearwardly inclined forks 5 in which pneumatic-tire rear wheels 6 are journaled. The cross shaft 4 is rotatably adjustable, to alter the relative elevation of the rear wheels 6, by means of a radial hand lever 7 which upstands from said cross shaft. A notched latching bar 8 is pivoted, as at 9, to the radial hand lever 7 intermediate its ends, and projects forwardly into selective positional engagement with a lateral pin 10 on a post 11 which upstands from the frame 1 ahead of said cross shaft 4. The notched latching bar 8 is normally urged to a pin engaging position by means of a tension spring 12.

A longitudinal supporting beam 13 overhangs the up-bent forward end portion 3 of the main frame 1, and said beam is pivoted, intermediate its ends, as at 14, to a bracket 15 for vertical adjustment. The rear end of the longitudinal supporting beam 3 is straddled by an arch member 16 which upstands from the main frame 1, and a screw 17 is threaded through the top of such arch member 16 and extends through the beam 13, with stop nuts 18 on the screw below said beam. The screw 17 is formed with a hand crank 19 whereby the screw may be actuated to effect vertical swinging adjustment of the supporting beam 13; such beam being fitted, at its forward end, with a fork 20 which carries a front wheel 21 centrally between the sides of the implement.

With the rear wheels 6 and the front wheel 21 mounted in tricycle arrangement, the former run in the furrows on opposite sides of the row, while the latter runs atop the row.

By proper vertical adjustment of the rear wheels 6 by the radial lever 7, and the front wheel 21 by the screw 17, the main frame 1 can be properly positioned relative to the top of the row for effective operation of the cutting mechanism hereinafter described.

The implement is adapted to be coupled to a tractor in draft relation by means of a draft frame or yoke 22 pivoted at transversely spaced points, as at 23, to the main frame 1, and thence extending forwardly to ahead of the front wheel 21. At its forward end the draft yoke 22 includes a hitch 24.

The cutting mechanism of the implement comprises a rotary cutter, indicated generally at 25, disposed beneath the forward portion of the main frame 1, being fixed to the lower end of an upstanding spindle 26 journaled in connection with the main frame 1 by means including bearings 27.

The rotary cutter 25 includes a hub 28 on the lower end of the spindle 26, and blades 29 radiate from such hub in equally circumferentially spaced relation; the blades 29 having triangularly shaped blade tips 30 sharpened on the leading edges, and alternate ones of said blade tips being upwardly inclined, as shown, in order to travel in a different cutting path than the straight tipped blades.

Directly above the rotary cutter 25 the spindle 26 is encompassed by a rearwardly opening U-shaped shield 31 fixed to the under side of the main frame 1 whereby to prevent the vines from wrapping around such spindle. Additionally, a longitudinally extending vine divider or splitter plate 32 extends forwardly from the U-shield 31 centrally at the front thereof; such splitter plate being affixed to the under side of the up-bent, forward end portion 3 of the main frame 1.

At the rear end of the main frame 1 the deck 2 supports a small gasoline engine 33, and the latter drives the spindle 26 through the medium of an endless belt and pulley unit 34.

In order to permit the operator of the tractor to control the engine 33, a throttle cable 35 extends forwardly from said engine to connection with a hand lever 36 on the upper end of a post 37 which upstands from the beam 13 adjacent the hitch 24.

Vine pick-up deflector rods 38 extend at a forward and downward incline on opposite sides and to points ahead of the rotary cutter 25; such deflector rods being fixed to the forward ends of supporting arms 39 secured to the main frame 1.

At their upper ends the deflector rods 38 merge in integral relation with downwardly inclined, rearwardly diverging vine deflector rods 40; the latter terminating inwardly of the rear wheels 6. Other vine deflector rods 41 are secured to the main frame 1 adjacent its rear end and extend rearwardly and downwardly in diverging relation.

When the above described implement is in use the rear wheels 6 and front wheel 21 are first adjusted so that said wheels 6 run in the furrows at opposite sides of the row, and the wheel 21 runs on the row, with the rotary cutter 25 immediately adjacent the top of said row.

Thereafter, as the implement advances along the row, with the rotary cutter 25 turning at relatively high speed, the vine pick-up deflector rods 38 which penetrate to a certain extent into the row on the opposite sides, elevate the vines, which are then severed by said rotary cutter 25. The severance of the vines is aided by the splitter plate 32, and after the vines are cut by the rotary cutter 25 they are deflected to opposite sides of the row and into the corresponding furrows by the deflector rods 40; further deflection of the cut vines being accomplished by the rods 41. Also, the deflector rods 41, together with short deflector rods 42 at forward points on opposite sides of the main frame 1, prevent the cut vines from entangling with the engine 33 or the driving connections.

By reason of the employment of a draft yoke 22 pivotally connected to the frame structure comprised of the main frame 1 and longitudinal supporting beam 3, any up or down motion of the tractor due to ground irregularity is not transmitted to the implement, and the same continues to travel along the row in proper cutting relationship to the vines.

In order to prevent the draft yoke from falling to the ground at any time, stops 43 are provided on opposite sides of the up-bent forward end portion 3 of the main frame 1.

With the described implement, the vines growing on a crop row, as for example sweet potato vines, are effectively and rapidly cut and windrowed to opposite sides of the row so as to permit of subsequent digging and harvesting of the crop without obstruction by such vines.

From the foregoing description it will be readily seen that there has been produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An implement for cutting row crop vines including a wheel-supported frame structure adapted for travel along a row, and an upstanding-axis rotary cutter mounted on and below the frame structure, a spindle upstanding from the cutter, a front upstanding shield about and spaced from the spindle and depending at the front to a level adjacent that of the cutter, and a longitudinal splitter plate, disposed vertically on edge, extending forwardly from the shield substantially in alinement with the axis of the spindle.

2. An implement, as in claim 1, in which the splitter plate is provided with a longitudinal lower edge disposed with an upward slope relative to the cutter.

3. A structure, as in claim 2, with a similarly sloping transversely horizontal plate above and symmetrically disposed relative to the splitter plate, and extending thence rearwardly over the shield and cutter substantially at right angles to the axis of the cutter.

References Cited in the file of this patent

UNITED STATES PATENTS

| Number | Name | Date |
|---|---|---|
| 578,250 | Holland-Letz | Mar. 2, 1897 |
| 1,211,566 | Fortney | Jan. 9, 1917 |
| 1,675,903 | Murphy | July 3, 1928 |
| 2,052,802 | Schatz | Sept. 1, 1936 |
| 2,514,278 | Dunn et al. | July 4, 1950 |
| 2,564,201 | Hainke | Aug. 14, 1951 |
| 2,564,586 | Smith et al. | Aug. 14, 1951 |
| 2,576,886 | McCoy | Nov. 27, 1951 |
| 2,633,689 | Gunderson | Apr. 7, 1953 |